(12) United States Patent
Kosann et al.

(10) Patent No.: US 9,460,688 B2
(45) Date of Patent: Oct. 4, 2016

(54) ELECTRONIC DISPLAY LOCKET AND SYSTEM

(71) Applicants: Rod G. Kosann, New Canaan, CT (US); Monica Rich Kosann, New Canaan, CT (US)

(72) Inventors: Rod G. Kosann, New Canaan, CT (US); Monica Rich Kosann, New Canaan, CT (US)

( * ) Notice: Subject to any disclaimer, the term of this patent is extended or adjusted under 35 U.S.C. 154(b) by 225 days.

(21) Appl. No.: 14/305,869

(22) Filed: Jun. 16, 2014

(65) Prior Publication Data

US 2015/0364112 A1 Dec. 17, 2015

(51) Int. Cl.
| | | |
|---|---|---|
| *H04B 1/38* | (2015.01) | |
| *G09G 5/12* | (2006.01) | |
| *A44C 25/00* | (2006.01) | |
| *H04W 4/00* | (2009.01) | |
| *H04B 1/40* | (2015.01) | |
| *G06F 3/147* | (2006.01) | |
| *H04B 1/3827* | (2015.01) | |
| *H04B 1/3888* | (2015.01) | |

(52) U.S. Cl.
CPC ............. *G09G 5/12* (2013.01); *A44C 25/002* (2013.01); *G06F 3/147* (2013.01); *H04B 1/385* (2013.01); *H04B 1/3888* (2013.01); *H04B 1/40* (2013.01); *H04W 4/008* (2013.01); *A44C 25/004* (2013.01); *G09G 2370/10* (2013.01); *G09G 2370/16* (2013.01); *G09G 2370/22* (2013.01); *G09G 2380/02* (2013.01); *H04B 2001/3866* (2013.01)

(58) Field of Classification Search
CPC ....... H04W 88/02; H04M 19/14; H05K 7/16
USPC .......................... 455/557, 567, 550.1; 345/2.3
See application file for complete search history.

(56) References Cited

U.S. PATENT DOCUMENTS

| | | |
|---|---|---|
| 6,424,884 B1 | 7/2002 | Brooke, Jr. et al. |
| 6,527,610 B1 | 3/2003 | Hornsby et al. |
| D482,521 S * | 11/2003 | Taylor ........................... D3/215 |
| 6,687,675 B1 | 2/2004 | Archambeau |
| 7,031,804 B2 | 4/2006 | Brooke, Jr. et al. |
| 7,378,939 B2 | 5/2008 | Sengupta et al. |
| 7,634,068 B1 | 12/2009 | Flammer |
| 7,649,458 B2 | 1/2010 | Mrazovich |
| 7,712,675 B2 | 5/2010 | Balinsky et al. |
| 7,734,118 B2 | 6/2010 | Chaudhury et al. |

(Continued)

OTHER PUBLICATIONS

18K Yellow Gold Petite Round Double-Sided Rock Crystal Over Mother of Pearl Stone Locket, website product description, available at http:/shop.mrkstyle.com, downloaded Jun. 9, 2014.

(Continued)

*Primary Examiner* — Danh Le
(74) *Attorney, Agent, or Firm* — Gordon & Jacobson, P.C.

(57) ABSTRACT

A locket includes a chamber and a door, with the chamber housing an electronic display, a microprocessor with associated memory coupled thereto, a wireless transceiver coupled to the microprocessor, and a power source. Messages/pictures can be displayed on the display through use of a system incorporating the locket, a mobile unit having a locket application and a wireless transceiver, and an application server device with a database. The system may also include a separately networked computer-type device. A locket user can log into the application server, register the locket, and create a user profile including one or more of interests, personal information, social connections, etc., that would establish how the locket can receive content. The system allows permitted friends to send messages/pictures through the application server to the locket for display.

7 Claims, 3 Drawing Sheets

(56) References Cited

U.S. PATENT DOCUMENTS

| | | |
|---|---|---|
| 7,752,605 B2 | 7/2010 | Qadeer et al. |
| 7,800,615 B2 | 9/2010 | MaPherson |
| 7,903,797 B1 | 3/2011 | Flammer |
| 8,438,482 B2 | 5/2013 | Amarasingham et al. |
| 8,548,434 B2 | 10/2013 | Raffle |
| 2005/0237699 A1* | 10/2005 | Carroll .................. G06F 1/1616 361/600 |
| 2010/0328223 A1* | 12/2010 | Mockarram-Dorri .. G06F 3/041 345/173 |
| 2011/0285607 A1* | 11/2011 | Kim ......................... H05K 7/16 345/1.3 |
| 2013/0141373 A1* | 6/2013 | Takuma .............. G06F 3/04883 345/173 |
| 2014/0195826 A1* | 7/2014 | Wojcik ................ H05K 5/0086 713/300 |
| 2015/0062525 A1* | 3/2015 | Hirakata ........... G02F 1/133305 349/158 |

OTHER PUBLICATIONS

Sterling Silver Rock Crystal Locket with White Saphire Accents on a 30" Chain, website product description, available at http:/shop.mrkstyle.com, downloaded Jun. 9, 2014.

Sharp 0.99-inch (diameter) Memory LCD, website product description, available at http://www.sharpmemorylcd.com, downloaded Jun. 9, 2014.

NHJ VTV-101 1.5 inch LCD Wristwatch Television, website product description, available at Overstock.com, downloaded Jun. 9, 2014.

Wireles Charging & How Inductive Chargers Work, PowerbyProxi, available at http://powerbyproxi.com, downloaded Jun. 9, 2014.

* cited by examiner

ELECTRONIC DISPLAY LOCKET AND SYSTEM

BACKGROUND OF THE INVENTION

1. Field

The subject disclosure relates to small wearable devices incorporating an electronic display and systems associated therewith. More particularly, the subject disclosure relates to lockets and other wearable devices that incorporate an electronic display and systems associated therewith where the user may control in advance what and who can provide viewable information and pictures to the wearable device.

2. State of the Art

Lockets are pendants with a small chamber and a door that opens to reveal a photograph or other small item held in the chamber. Lockets are generally worn on chains around the neck of a person and often hold a photo of the person who gave the locket. Lockets come in various shapes and are often made of precious metals such as gold or silver, and may also be set with precious or semi-precious stones. They generally hold one or two small photographs or a keepsake item such as a lock of hair.

SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a locket is provided that includes a chamber and a door covering the chamber, with the chamber housing an electronic display, a microprocessor with associated memory coupled to the display, a wireless transceiver coupled to the microprocessor, and a power source. In one embodiment, the chamber is made at least partially of a precious metal such as gold or silver, and the door is made at least partially of a precious metal such as gold or silver, or of crystal, quartz, or mother-of-pearl, or a precious or semi-precious stone. In one embodiment, the electronic display is an LCD display no more than two inches by two inches in size. In another embodiment, the electronic display is an LCD display of approximately one inch by one inch in size. In one embodiment, the battery is a rechargeable battery. The rechargeable battery may be recharged using a hardwire connection provided to the locket, or the locket may be provided with an induction coil and the battery may be recharged using a surface (induction) charger.

In one embodiment, a system is provided that includes the afore-described locket having the chamber, door, electronic display, microprocessor, wireless transceiver and power source. The system further includes a mobile unit such as a cell phone having a locket application and a wireless transceiver, and an application server device with a database. In one embodiment, the system may also include a separately networked device such as a desktop, laptop, or other computer.

According to one embodiment, upon purchase (or receipt) of the locket, a user could log into the application server device, register the locket, and create a profile for themselves. Login could be established via a mobile phone, or a networked device such as a desktop, laptop, or other computer. The profile could establish one or more of interests, personal information, social connections, etc., that would establish how the locket can receive content. For example, the profile could indicate that the user is religious and would like to receive a message or picture with religious content every morning at 6 AM. Alternatively, or in addition, as another example, the profile could identify the email addresses of one, two, or more people ("friend(s)") from whom the user is willing to receive pictures and/or messages on the locket. The user could also provide a default picture for the locket. The personal information kept in the profile may include an email address for the user and a mobile telephone number. All of the information regarding the profile is stored on the application server device. In one embodiment, the user might then download an application ("a locket app") for a mobile device that the user is likely to keep near herself, e.g., a mobile phone. The mobile device may then be synchronized (synched) to the locket via the wireless transceivers. For example, each transceiver may be a BLUETOOTH transceiver (Bluetooth being a trademark of the Bluetooth Special Interest Group, of Kirkland, Wash.) using a BLUETOOTH standard protocol. Thus, upon registration and generation of a profile, the application server device may send a message (e.g., a default picture selected by the user that may have been uploaded to the application server device by the user) to the mobile device. If the locket is on or is turned on, the message is then forwarded to the locket using the BLUETOOTH protocol, and the locket can then display the message on the LCD display.

In one embodiment, when a "friend" wishes to send the locket user a picture or message, the friend can access the application server device and upon establishing their identity, can upload the picture and/or message for delivery to the locket of the user. In one embodiment, if the user's profile permits receipt of a picture and/or message from the friend, the picture and/or message is forwarded to the mobile device of the user utilizing the "locket app" synching. Then, when the user turns on the locket, or if the locket is kept on, the mobile device will forward the picture and/or message to the locket utilizing the transceivers, and the picture and/or message will appear on the LCD display.

In one embodiment, the user may set her profile to keep a friend's message or picture for a predetermined amount of time until the default message or picture reappears. In another embodiment, the user may generate a message from the locket or from the mobile device to reset the display. In another embodiment, the profile may keep a friend's message or picture until another message or picture is received.

In one embodiment, the locket is provided with an on-off switch that is activated when the locket is opened. In other words, the electronics of the locket is turned off when the door of the locket is closed, and the locket turns on when the door is opened.

Additional aspects of the subject disclosure will become evident to those of ordinary skill in the art upon reference to the drawings, specification, and claims hereof.

DETAILED DESCRIPTION OF THE PREFERRED EMBODIMENTS

Figure 1:
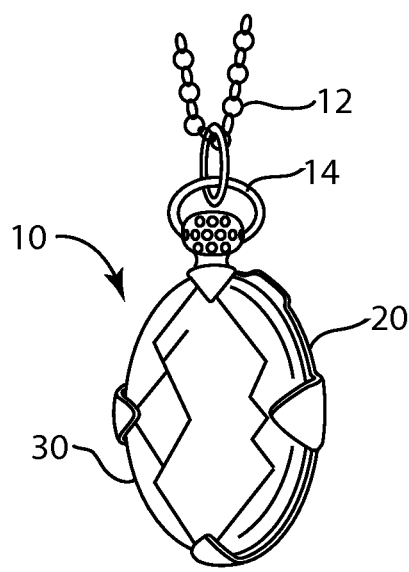
FIG. 1 is a perspective view of an electronic display locket in a closed position.
Figure 2:
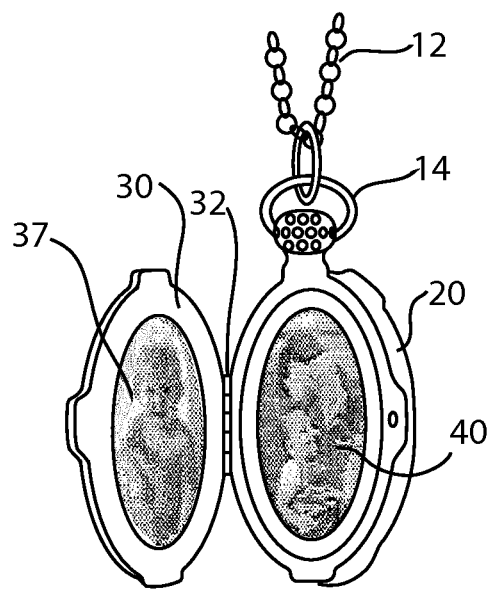
FIG. 2 is a perspective view of an electronic display locket in an open position.
Figure 3:
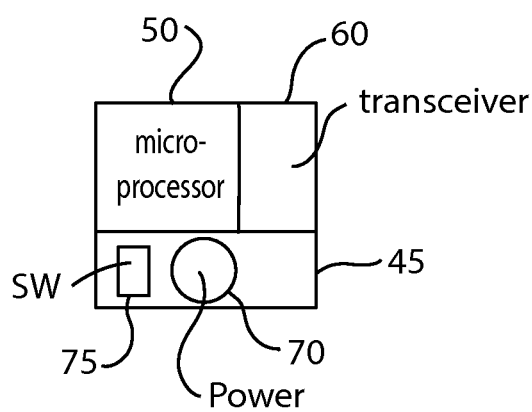
FIG. 3 is a block diagram of an electronic display locket.

One embodiment of an electronic display locket 10 is seen in FIGS. 1-3. In FIGS. 1 and 2, locket 10 is shown hanging from a chain 12 via a connector link 14. The locket 10 includes a chamber 20 having a plurality of walls and a door 30 covering the chamber. The door 30 is movable from a closed locket position (FIG. 1) to an open locket position (FIG. 2). While the door and chamber are shown with hinges 32 for rotation of the door relative to the chamber, it will be appreciated that the door of the locket could swing open with the door staying in the same plane, rather than rotating about a hinge axis. In one embodiment, the chamber is made at least partially of a precious metal such as gold or silver, and the door is made at least partially of a precious metal such as gold or silver, or of crystal, quartz, or mother-of-pearl, or of a precious or semi-precious stone. In one embodiment, the door is provided with a slot for storing a tangible picture 37. The door and chamber may also provided with a latch-clasp mechanism for keeping the door in a closed position and for permitting release of the door.

As seen in FIG. 2, the chamber 20 of the locket 10 houses an electronic display 40 which is either flush with or slightly recessed into the top of the chamber. Behind the display 40, is a substrate 45 (such as a PCB board) that supports electronic components including microprocessor 50 (with associated memory) coupled to the display 40, a short range wireless transceiver 60 coupled to the microprocessor, and a power source 70 as shown in FIG. 3. In one embodiment, the electronic display is an LCD display no more than two inches by two inches in size.

In another embodiment, the electronic display is an LCD display of approximately one inch by one inch in size. For purposes herein, the term "approximately" when relating to sizes shall be understood to mean plus or minus 10%. In other embodiments, the electronic display is between 0.75 inches and 2.5 inches in two dimensions. The electronic display may be round, octagonal, square, rectangular, oval, or of other shape. The display may also be partly covered along portions of its periphery so as to appear to assume a particular shape. Various such displays are available such as a LS010B7DH01 0.99-inch Memory LCD of Sharp Electronics Corp., Mahwah, N.J. The short range wireless transceiver 60 can provide for bidirectional wireless communication to other nearby devices via one or more standard wireless protocols such as the BLUETOOTH protocol. The microprocessor 50, transceiver 60 and display 40 are powered by the battery 70 that provides appropriate voltage(s) to the microprocessor, transceiver and display, or which includes circuitry to provide the required voltage(s). In one embodiment, the battery is a button type battery that can be removed and replaced from the back of the chamber via a second chamber door (not shown). In another embodiment, the battery is a rechargeable battery or super-capacitor. The rechargeable battery may be recharged using a hardwire connection provided to the locket (not shown). In another embodiment, the locket may be provided with an induction coil (not shown), and associated circuitry that operate to recharge the battery using a surface (induction) charger. Where an induction coil is utilized, the back of the chamber can be formed from a non-metallic substance such as crystal, plastic, quartz, or other stone that will allow for induction charging via the coil.

In one embodiment, an on-off switch 75 is provided in or adjacent to the chamber 20. The switch 75 is operatively coupled to the microprocessor 50 and can be configured to selective turn on/off one or more of the LCD display 40 and the transceiver 60. In one embodiment, the switch 75 is activated by the door 30 such that when the door of the locket is closed, the electronics are turned off, and when the door is opened, the electronics are turned on. By way of example, the switch, in a first position may interrupt a power supply circuit to the elements that are turned off, and in a second position, the power supply circuit is completed.

Figure 4:
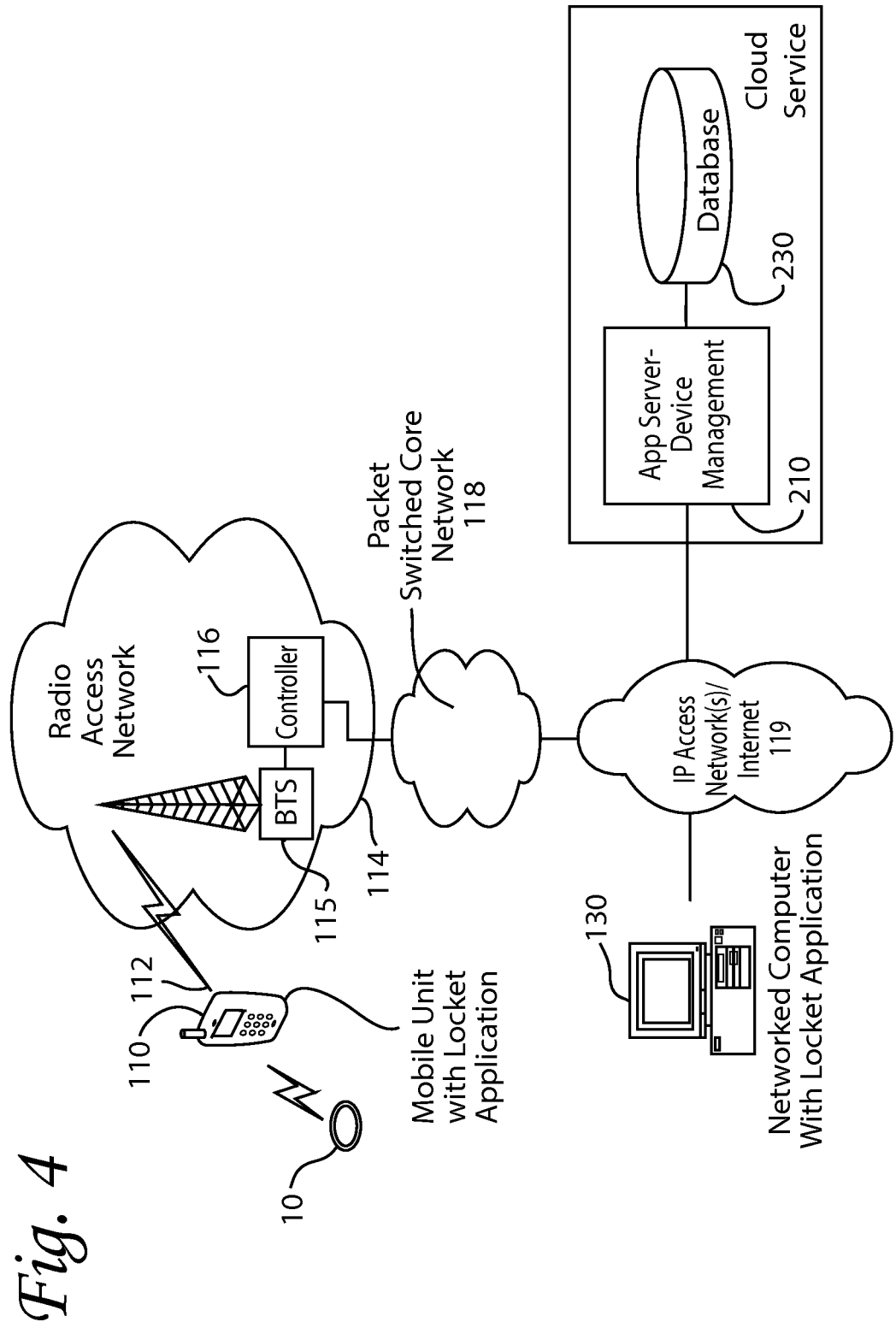
FIG. 4 is a diagram of a system incorporating an electronic display locket, a mobile unit with a locket app, and an application server device.

Turning now to FIG. 4, a diagram of a system 100 is provided incorporating an electronic display locket 10, a mobile unit 110 with a locket app, and an application server device 210. More particularly, a mobile unit 110 such as a cell phone, an iPAD (a trademark of Apple, Inc. of Cupertino, Calif.), or similar device is provided with a short range wireless transceiver 112 such as a BLUETOOTH transceiver. As suggested by FIG. 4, the transceiver 112 of the mobile unit 110 and the transceiver 60 of the electronic display locket 10 can communicate with each other. In addition, the mobile unit 110 supports wireless communication over a cell-based radio access network 114 that includes base stations 115 and corresponding controllers 116 that interface to a packet switched core network 118 that is connected to an IP access network and the Internet 119. The mobile unit 110 is also provided with a locket app that may be downloaded to the mobile unit 110 via the radio access network 114 as described hereinafter. In one embodiment, the system may also include a separately networked device such as a desktop, laptop, or other computer 130 that is coupled to the Internet 119. The mobile unit 110, and where utilized, the networked computer 130 include software suitable for interacting with the cloud service utilizing networked communication.

The communication network(s) 114, 118, 119, as well as the operating system of the mobile unit 110 and the networked computer 130 can provide support for TCP/IP networking and suitable messaging protocols in order to communicate messages and/or data between such devices and the cloud service. Those skilled in the art will recognize that the complete structure and operation of communication networks and other components within the system are not depicted or described. Embodiments may be employed in conjunction with known communications networks and other components.

The system of FIG. 4 incorporates the application server device 210 and associated database 230. In conjunction with the database 230, the application server device 210 can communicate with the locket app, executing on the mobile unit 110 in order to perform multiple tasks and allowing access by the user of the locket and friends of the user to perform multiple tasks. While not shown, mobile units and/or networked computers of friends may also be connected via either or both of the radio access network 114 and the Internet 119 to the application server device 210. In addition, while not shown, a single application server device 210 may be used to service the functionality of numerous (e.g., thousands or tens of thousands or more) different electronic display lockets.

In one embodiment, for each electronic display locket, the application server 210 is suitably configured to: register the electronic display locket, receive and store a profile for the locket user, provide a locket app to the mobile unit and/or networked computer of the user, determine whether a contact providing messages and/or pictures is a friend of the user, receive messages and/or pictures from friends of the user, and exchange data with the mobile device 110 of the user via the radio access network 114 in order to load data representing messages and/or pictures onto the mobile unit. Once loaded onto the mobile unit 110, the messages and/or pictures can be communicated to the locket 10 via the wireless link therebetween for visual display on the display screen 40 of the locket 10.

Figure 5:
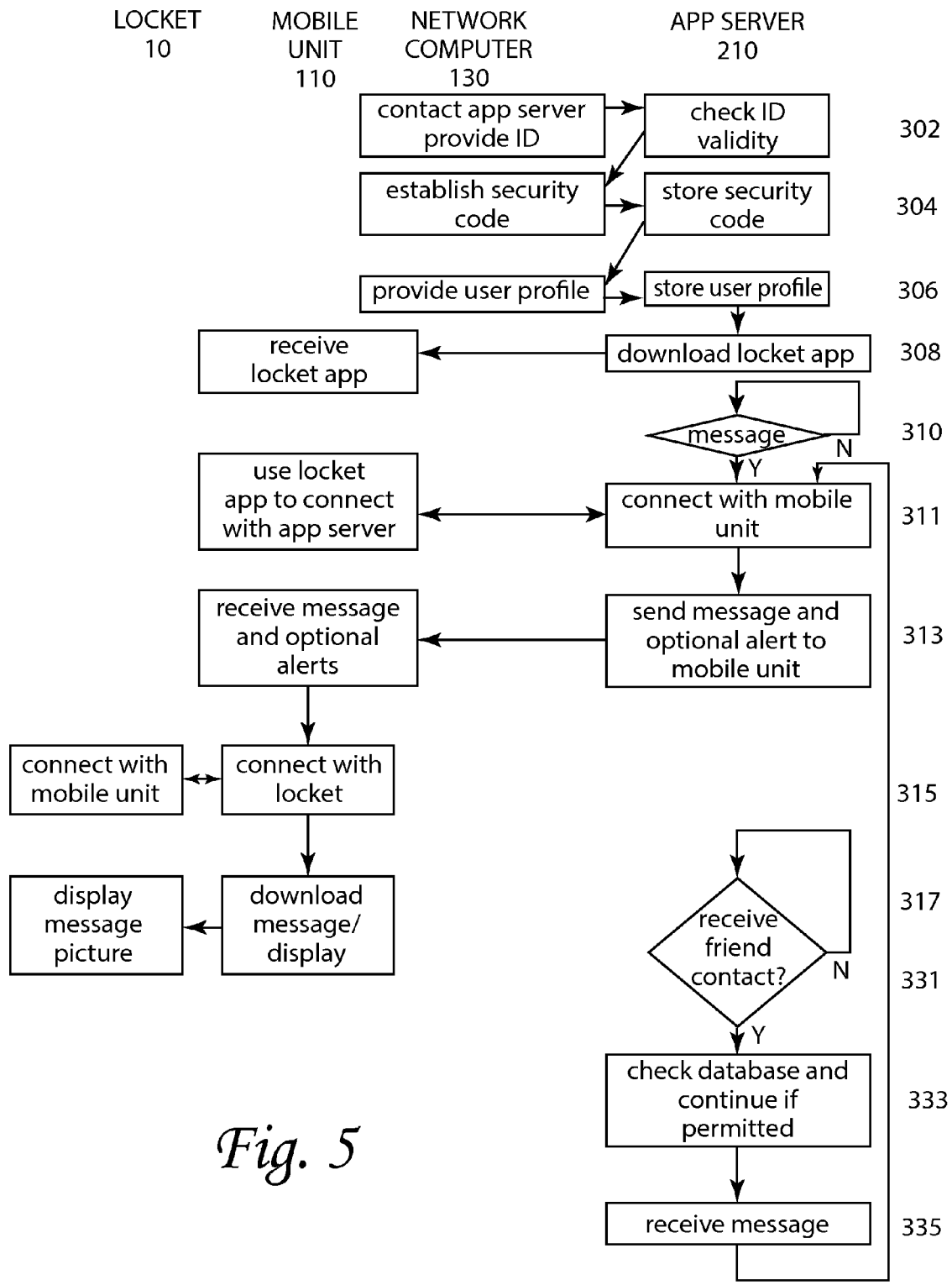
FIG. 5 is a flow diagram showing a method of initiating and using an electronic display locket.

In one aspect, each electronic display locket 10 may be provided with a unique serial number or code that identifies that locket. When a user acquires the locket, and as seen in FIG. 5, that identification may be provided to the application server 210 by contacting the application server 210 and providing the identification at 302. The electronic display locket will then be registered. The user may be asked at 304 to provide and may provide a password or other code for security purposes that may be used upon logging into the server.

In one aspect, once an electronic display locket is registered, the user (owner) of the locket may generate a user profile at 306. The profile may establish one or more of interests, personal information, social connections, etc., that would establish how the user's locket can receive content. For example, the profile could indicate that the user is religious and would like to receive a message or picture with religious content every morning at 6 AM. That message or picture may be provided by the application server provider or a subcontractor and stored in memory associated with the application server device for delivery at the desired time. Alternatively, the profile could indicate that the user enjoys surprises and would like images, words, quotations, etc. provided to the locket at random times. The application server could then access a database of images, words, or quotations and deliver the same at random times. Alternatively or in addition, as another example, the profile could identify the email addresses of one, two, or more people ("friend(s)") from whom the user is willing to receive pictures and/or messages on the locket. The user could also provide a default picture for the locket. The personal information kept in the profile may include an email address for the user and a mobile telephone number. All of the information regarding the profile is stored in the database 230 associated with the application server device 210.

In one aspect, once an electronic display locket is registered, at 308 the user might then download from the application server device 210 an application ("a locket app") for a mobile device that the user is likely to keep near herself, e.g., a mobile phone, and that In one aspect, at any time after the electronic locket is registered and the user has obtained the locket app for her mobile device, if a message is to be sent at 310, the mobile device may be synchronized (synched) by connecting at 311 to the application server device 210 and by downloading the message at 313. This may be done in a manner chosen by the user or according to a default mechanism. For example, the user might choose to actively generate a synchronization by accessing the app on the mobile device 110 and hitting "synch". Alternatively, as long as the app is running on the mobile device 110, the application server device 210 may periodically synch. Upon synchronization, the application server device 210 may send a message at 313 (e.g., a default picture selected by the user that may have been uploaded to the application server device by the user) to the mobile device.

In one aspect, when a message from the application server device 210 is provided to the mobile device 110, the application server may also send a text message alert (or a text message may be automatically be generated by the app) to the mobile device 110 that notifies the user that a message or picture is available. For example, the alert might say "Message Waiting". As another example, the alert might use a trademark phrase such as "WHAT'S IN MY LOCKET?" in order to notify the user that a message or picture is being provided for display.

In one aspect, for a registered electronic locket, once a message or picture is has been sent to the mobile device 110 for display on the locket, if the locket is on or is turned on and within range of the mobile device 110, the locket and mobile device are synched by connecting at 315 and by forwarding the message to the locket using the BLUETOOTH protocol at 317. The locket can then display the message on the LCD display at 317. In other words, the electronic display locket 10 will synch to the mobile device 110 and receive the message for display. In one embodiment, the user may control the synching of the locket 10 to the mobile device 110 with a control button on the locket. In another embodiment, the user may control the synching of the locket 10 to the mobile device 110 by actively generating a synchronization via the locket app on the mobile device 110.

In one aspect, when a "friend" wishes to send the locket user a picture or message, the friend can access the application server device 210 at 331, and upon establishing their identity, can upload (either directly, or using an app provided by the application server device 210 to the friend) the picture and/or message for delivery to the locket of the user. In one embodiment, based on a look-up in the profile of the user at 333, if the user's profile permits receipt of a picture and/or message from the friend, the picture and/or message is received from the friend at 335 and forwarded to the mobile device of the user utilizing the "locket app" synching. In one embodiment, the friend may establish the timing of the forwarding of the picture and/or message. Then, immediately, or at an appropriate time, when the user turns on the locket, or if the locket is kept on, the mobile device will forward the picture and/or message to the locket utilizing the transceivers, and the picture and/or message will appear on the LCD display as previously described.

In one embodiment, the user may set her profile to keep a friend's message or picture for a predetermined amount of time until the default message or picture reappears. In another embodiment, the user may generate a message from the locket via a reset button or the like (not shown) or from the mobile device 210 using the locket app to reset the display. In another embodiment, the profile may keep a friend's message or picture until another message or picture is received.

In one embodiment, the locket has no control buttons for use by the user that impact the receiving or displaying of messages or pictures.

In one embodiment, the locket may have a single button for use by the user for controlling an aspect of the receiving or displaying of messages or pictures.

In one embodiment, the locket may have a button for use by the user that controls the opening of the locket.

In one embodiment, the locket may have a button for use by the user that controls the powering on or off of the locket.

According to one aspect, the locket may be worn on a wrist and appear to be a wristwatch with a cover.

There have been described and illustrated herein several embodiments of an electronic display locket and system and a method of using the same. While particular embodiments of the invention have been described, it is not intended that the invention be limited thereto, as it is intended that the invention be as broad in scope as the art will allow and that the specification be read likewise. Thus, while particular electronic displays have been disclosed, it will be appreciated that other electronic displays may be used as well. In addition, while particular types of power sources have been disclosed, it will be understood that other power sources can be used. While particular materials for the locket chamber and door have been disclosed, other materials could be utilized. By way of example and not by way of limitation, the locket chamber and/or door could utilize acrylic or other plastics, brass, and other metals or alloys. Also, while the "door" of the locket in the described embodiments as seen as the front of the locket, and the chamber is seen as the back of the locket, the "door" could be the back, and the chamber could be the front. It will therefore be appreciated by those skilled in the art that yet other modifications could be made to the provided invention without deviating from its spirit and scope as claimed.

What is claimed is:

1. An electronic display device, comprising:
    a chamber having at least one wall, and an opening;
    a door coupled to said at least one wall and coupled to the chamber so that said door covers at least a first portion of a face of said chamber in a first position and so that said door reveals said at least a first portion of a face of said chamber in a second position;
    a hinge coupling said door and said chamber, and said chamber, door and hinge comprising a locket having a coupling element that couples to a chain;
    an electronic display for displaying pictures or messages, said electronic display located in said chamber, wherein said electronic display is a liquid crystal display (LCD) of at most 2 inches by 2 inches in size;
    a processor coupled to said electronic display, said processor controlling said electronic display and located in said chamber;
    a wireless transceiver coupled to said processor and located in said chamber; and
    a power source coupled to said electronic display and said processor and located in said chamber.

2. The electronic display device according to claim 1, wherein:
    said power source is a rechargeable battery.

3. The electronic display device according to claim 1, wherein:
    said power source comprises an induction coil.

4. The electronic display device according to claim 1, wherein:
    at least one of said at least one side wall, back wall, and door comprises precious metal.

5. The electronic display device according to claim 1, wherein:
    at least one of said at least one side wall, back wall, and door comprises a semi-precious or precious stone.

6. The electronic display device according to claim 1, further comprising:
    an on/off switch coupled to said display and activated by said door.

7. The electronic display according to claim 1, wherein:
    said wireless transceiver is a short distance wireless transceiver.

* * * * *